United States Patent [19]

Blanchard et al.

[11] Patent Number: 4,621,071

[45] Date of Patent: Nov. 4, 1986

[54] COMPOSITE CATALYST FOR TREATMENT OF VEHICULAR EXHAUST GASES AND PROCESS FOR THE PREPARATION OF THE CATALYST

[75] Inventors: Gilbert Blanchard, Le Plessis Belleville; Michel Prigent, Rueil Malmaison, both of France

[73] Assignee: Pro-Catalyse, Rueil-Maimaison, France

[21] Appl. No.: 679,449

[22] Filed: Dec. 7, 1984

[30] Foreign Application Priority Data

Dec. 9, 1983 [FR] France ................................ 83 19728

[51] Int. Cl.[4] ........................ B01J 21/04; B01J 23/10; B01J 23/64; B01J 23/89
[52] U.S. Cl. .................................. 502/302; 502/243; 502/261; 502/262; 502/303; 502/304; 502/313; 502/324; 502/325; 502/326; 502/327; 502/328; 502/329; 502/331; 502/332; 502/333; 502/334; 502/339; 423/213.5
[58] Field of Search ............... 502/242, 304, 313, 325, 502/326, 327, 329, 331, 333, 334, 339, 302, 303, 324, 328, 243, 261, 262, 332; 423/213.5

[56] References Cited

U.S. PATENT DOCUMENTS

| 3,787,333 | 1/1974 | Ichihara et al. ................. 502/314 |
| 4,294,726 | 10/1981 | Bozon et al. ...................... 502/304 |
| 4,299,734 | 11/1981 | Fujitani et al. .................... 502/304 |
| 4,492,769 | 1/1985 | Blanchard et al. ............. 502/304 X |

*Primary Examiner*—W. J. Shine
*Attorney, Agent, or Firm*—Burns, Doane, Swecker & Mathis

[57] ABSTRACT

A composite active phase/support catalyst adapted for the treatment of internal combustion engine exhaust gases, the active phase of which comprising at least one metal from a first group comprising platinum, palladium, iridium, rhodium, ruthenium, rhenium, silver, gold or plurality thereof and at least one additional metal and the support therefor comprising binder/filler admixture, is facilely prepared by (i) intimately admixing the binder and filler support material with at least 50% by weight but less than all of said at least one first group metal, or precursor thereof, and/or of said at least one additional metal, (ii) forming the resulting admixture into catalyst shaped article, (iii) drying and optionally calcining said catalyst shaped article, (iv) incorporating the remainder of said at least one first group metal, or precursor thereof, and/or said at least one additional metal into said catalyst shaped article, and then (v) drying and activating the composite catalyst.

19 Claims, No Drawings

COMPOSITE CATALYST FOR TREATMENT OF VEHICULAR EXHAUST GASES AND PROCESS FOR THE PREPARATION OF THE CATALYST

BACKGROUND OF THE INVENTION

1. Field of the Invention

The present invention relates to an improved process for preparing a catalyst for the treatment of vehicular exhaust gases, and, more especially, to a process for preparing a catalyst comprising a support and an active phase including at least one of a first group of metals comprising platinum group metals, rhenium, silver and gold and at least one additional metal.

2. Description of the Prior Art

Typically in this art, catalysts for the treatment of exhaust gases from internal combustion engines are prepared by incorporating the active phase with the support.

There are several known processes for incorporating the active phase with the support. It is thus possible to incorporate into the support each metal individually, or all of the metals together, by such techniques as coprecipitation, cogelling, ion exchange or impregnation.

SUMMARY OF THE INVENTION

A major object of the present invention is providing for markedly increasing the efficiency, as well as the useful lives, of catalysts for the treatment of vehicular exhaust gases, by characteristically incorporating the active phase thereof with the support therefor during the actual manufacture of the catalyst.

Briefly, the present invention features an improved process for preparing a catalyst for the treatment of exhaust gases from internal combustion engines, which catalyst is of the type including an active phase comprising at least one of a first group of metals comprising platinum group metals, rhenium, silver and gold and at least one additional metal and a support therefor obtained by mixing a binder and a filler, said process comprising the following stages:

(1) intimately admixing a filler, a binder and at least a portion of the active phase;

(2) forming the mixture into appropriate shaped article;

(3) drying and, if appropriate, calcining said shaped article;

(4) introducing the remaining portion of the active phase therein; and (5) drying same, followed by the activation thereof, characterized in that the major portion, i.e., at least 50% by weight, of the first group metals and/or the major part of the additional metals are incorporated in the binder during the first state mixing.

DETAILED DESCRIPTION OF THE INVENTION

More particularly according to the present invention, the first group metals constituting the subject improved catalysts advantageously comprise platinum, palladium, iridium, rhodium, ruthenium, rhenium, silver and/or gold.

In a preferred catalytic embodiment of the invention, the first group metal comprises platinum and, if appropriate, at least one of the metals, palladium, iridium and rhodium.

The total amount of the first group metals in the catalysts prepared according to the process of the invention typically varies from 0.005 to 0.8% by weight relative to the catalyst. When the preferred catalytic formulations are employed, the amount of platinum and, if appropriate, palladium, typically varies from 0.04 to 0.5% by weight relative to the catalyst, and, if appropriate, that of iridium and rhodium typically varies from 0.002 to 0.1%.

The additional metals which are employed according to the process of the invention comprise cobalt, zinc, manganese, nickel, tungsten, yttrium, the lanthanides, iron, copper, chromium, zirconium, molybdenum, tin, calcium, strontium, barium and, if appropriate, the transition metals of the first, second and third columns of the Periodic Table of the elements.

In the preferred catalytic formulations of the invention, said additional metals comprise cerium, iron, copper, zirconium and yttrium. In the more preferred catalytic formulations, such additional metals comprise cerium and/or iron.

The total amount of additional metal in the catalysts prepared according to the process of the invention typically varies from 0.1 to 10% by weight relative to the catalyst.

The first stage of mixing the filler, binder and a portion of the active phase according to the invention is carried out by adding said portion of the active phase, or precursor thereof, during the production of the support. The major portion of the first group metals and/or the major portion of the additional metals is introduced in the binder during this first stage.

To introduce the major portion of the first group metals or additional metals in the binder, the procedure is to impregnate or mix the binder with the said metals, or precursors thereof, before mixing with the filler.

By "major portion" of the first group metals or additional metals there is intended at least 50% and preferably at least 70% by weight of these metals relative, respectively, to the total weight of the first group metals or of the total additional metals which are introduced into the catalyst.

When the major portion of the first group metals is introduced into the binder, the additional metals are preferably also introduced during the first stage. This introduction of the additional metals is carried out in such a manner that the latter are: either predominantly in the binder, or predominantly in the filler, or both in the binder and in the filler. Such addition is carried out by impregnating or mixing the binder and/or the filler with the required metals or precursors thereof.

When the major portion of the additional metals is introduced in the binder, the first group metals are, preferably, introduced during the fourth stage by impregnating the mixture formed, dried and, if appropriate, calcined, with the required metals or precursors thereof.

The binder and the filler which define the support for the catalysts according to the invention advantageously comprise the compounds, and generally the hydroxides or oxides, of aluminum, silicon, titanium, zirconium, magnesium, calcium, strontium, barium, yttrium, the lanthanides, hafnium, thorium, niobium, tantalum, chromium, molybdenum, and tungsten. In another preferred embodiment of the invention, a binder of aluminum hydroxide or oxyhydroxide and a filler of aluminum oxide are used.

Alumina supports obtained by mixing a binder and an alumina filler are described below.

These supports are typically prepared from an aqueous composition of alumina, incorporating a binder which essentially forms the dispersed fraction and a filler which essentially forms the undispersed fraction of the composition. It is appropriate that the degree of dispersion of the composition in water, as a result of mixing the binder and the filler, should range from 10 to 80% and preferably from 15 to 60%. In addition it may be appropriate that the particle size distribution of the undispersed fraction of the composition be such that the mean diameter of the alumina particles comprising same ranges from 1 to 15 microns, at least 70% of these particles having a diameter ranging from one half of the mean diameter to twice the mean diameter, the purpose of this being to impart the required charcteristics of porosity to the support.

The degree of dispersion is expressed as total amount of alumina which remains in colloidal suspension after the composition has been subjected to centrifuging. This degres of dispersion may be measured in the following manner: the aqueous alumina composition is diluted such as to provide a total alumina concentration equal to 100 d/l; 100 cm$^3$ of this solution are subjected to violent stirring for 10 minutes; the solution is then centrifuged for 10 minutes at a speed of 3,000 revolutions per minute; the settled portion is separated from the unsettled portion consisting of a colloidal suspension of alumina; the settled portion is calcined and weighed, and the degree of dispersion is expressed as the relationship between the total initial amount of alumina in the composition, minus the settled amount of alumina, and the total initial amount of alumina in the composition.

The undispersed fraction of the composition essentially consists of the filler; a minor portion of the latter may originate from the binder.

The amount by weight of the binder in the composition advantageously ranges from 10 to 80% and preferably from 15 to 60%. As a result the amount by weight of the filler in the composition ranges from 20 to 90% and preferably from 40 to 85%.

In the alumina supports according to the invention, the alumina binder essentially consists of a fraction of dispersed alumina and, if appropriate, of a minor fraction of undispersed alumina; the dispersed fraction comprising at least 70% by weight of the binder. Hereinafter said dispersed fraction will be designated as the binder (even when all of the binder is not dispersed) and the undispersed fraction will be designated the filler (even when a portion of the filler, which is less than 10% by weight of the filler, is in the dispersed state).

The alumina binder employed must be capable of being gelled or coagulated by thermal or chemical action.

Gelling or coagulation by thermal action is well known to this art and can be effected by evaporating off the water from the aqueous suspension or dispersion of alumina which forms in the binder. Gelling or coagulation by chemical action is also well known to this art and can be effected by raising the pH of the aqueous suspension or dispersion of alumina which forms the binder to a value above 9, which corresponds to the isoelectric point of alumina.

The alumina binders which can be employed according to the invention are advantageously the aqueous suspensions or dispersions of fine or ultrafine boehmites which consist of particles having dimensions in the colloidal range, namely, below approximately 2000 Å.

The aqueous dispersions or suspensions of fine or ultrafine boehmites can be obtained, as is also well known to this art, by peptization of such products in water or acidified water. The fine or ultrafine boehmites employed according to the present invention may, in particular, have been obtained according to the process described in French Pat. Nos. 1,262,182 and 1,381,282 or in published European Patent Application No. 15,196.

French Pat. No. 1,262,182 describes, in particular, a process for preparing fine or ultrafine boehmite by heating an aqueous dispersion of alumina in the presence of a monovalent acid radical, the aqueous dispersion of alumina having been obtained from basic aluminum chloride, basic aluminum nitrate, aluminum hydroxide, alumina gel or colloidal solutions. This product, marketed by E. I. du Pont de Nemours under the tradename Baymal, is a fine or ultrafine fibrillar boehmite whose specific surface typically ranges from 250 to 350 m$^2$/g.

French Pat. No. 1,381,282 describes, in particular, a process for preparing fine or ultrafine boehmite comprising modifying, at a temperature of from 60° to 150° C., a suspension or cake of amorphous hydrated alumina gel containing up to 35% by weight of alumina, calculated as $Al_2O_3$, and relative to this alumina calculated as $Al_2O_3$ molecules, an amount of monovalent acidic ions ranging from 0.05 to 0.5, over a period of time of 15 hours to 10 days; the cake having been produced by dewatering, washing and filtering alumina gel continuously precipitated at a pH of from 8 to 9 from a solution of sodium hydroxide aluminate and nitric acid. The specific surface of these materials typically ranges from 200 to 600 m$^2$/g.

Published European Patent Application No. 15,196 describes a process for preparing boehmite at least partially in the form of ultrafine boehmite by treating, in an aqueous medium at a pH below 9, a powder of activated alumina produced by rapid dehydration of hydrargillite in a stream of hot gases.

It is also possible to employ as the alumina binder according to the invention aqueous suspensions or dispersions produced from pseudo-boehmite, amorphous alumina gels, aluminum hydroxide gels or ultrafine hydrargillite.

The pseudo-boehmite may advantageously have been prepared according to the process described in U.S. Pat. No. 3,630,670 by the reaction of an alkali metal aluminate solution with an inorganic acid solution. It may also have been prepared as described in French Pat. No. 1,357,830 by precipitation at pH 9, at a temperature slightly above ambient, beginning with reactants in concentratons such that approximately 50 g/l of alumina is obtained in the dispersion.

The amorphous alumina gels may advantageously have been prepared according to the processes described in the article "Alcoa Paper No. 19 (1972)—pages 9 to 12" and particularly by the reaction of aluminate and acid, or a salt of aluminum and a base or an aluminate and an aluminum salt or by hydrolysis of aluminum alcoholates or by hydrolysis of basic aluminum salts.

The aluminum hydroxide gels may advantageously be those prepared according to the processes described in U.S. Pat. Nos. 3,268,295 and 3,245,919.

Ultrafine hydrargillite may preferably have been prepared according to the process described in French Pat. No. 1,373,808, by modifying, at a temperature of from ambient temperature to 60° C., alumina gels in the form of cake, containing, relative to the alumina calculated as $Al_2O_3$ molecules, 0.10 monovalent acidic ions.

In the supports employed according to the invention, the alumina filler consists essentially of a non-dispersible alumina fraction and, if appropriate, a minor fraction of dispersible alumina which is dispersed in the composition, the undispersible fraction constituting at least 90% by weight of the filler. It may be preferable that the particle size distribution of the undispersed fraction of the composition, of which the filler thus substantially consists, is such that the mean diameter of the alumina particles of which it consists ranges from 1 to 15 microns, at least 70% of these particles having a diameter ranging from one half of the mean diameter to twice the mean diameter.

The alumina filler employed may all consist of alumina having the characteristics which have been described above. It is possible, in particular, to employ hydrated compounds of alumina such as hydrargillite, bayerite, boehmite, pseudoboehmite and gels of amorphous or substantially amorphous alumina. It is also possible to employ dehydrated or partially dehydrated forms of these compounds which consist of transition aluminas and which incorporate at least one of the phases rho, chi, eta, gamma, kappa, theta, delta and alpha.

In particular, it is especially advantageous to use alumina fillers obtained according to one of the following processes, after optionally grinding and screening the particles thereof: (i) An aqueous solution of an aluminum salt is precipitated with a solution of an alkali metal aluminate, the precipitate produced is atomized and is then resuspended in an aqueous solution of a pH of from 4.5 to 7, the alumina spraying mixture obtained is atomized and dried, and the product is washed, dried and calcined (process described in U.S. Pat. No. 3,520,654);

(ii) By precipitating an alumina gel at a pH of from 7.5 to 11, washing, dewatering, resuspending, fast dehydration of the product in a stream of hot gases at an inlet temperature of from approximately 350° to 1000° C., followed by calcination (process described in French Pat. No. 2,221,405);

(iii) By precipitating an alumina gel at a pH of from 7 to 10.5, aging the precipitate at a pH of from 10 to 11, homogenization and atomization at 250°–550° C. of the spraying mixture obtained, followed by calcination (process described in British Pat. No. 888,772);

(iv) By precipitating an alkali metal aluminate with an inorganic acid at a temperature of from 30° to 75° C., aging in a second reactor at 35°–70° C. at a pH close to 7, recycling the spraying mixture obtained to the mixing reactor, filtering, washing, spray-drying the product, followed by calcination (process described in U.S. Pat. No. 3,630,670);

(v) By rapid dehydration of aluminum hydroxides or oxyhydroxides and, more particularly, hydrargillite in a stream of hot gases; this dehydration being caried out in any suitable apparatus by means of a stream of hot gases, the temperature of the gases entering the apparatus generally varying from about 400 1200° C., the contact time of the hydroxide or oxyhydroxide with the hot gases typically ranging from a fraction of a second to 4–5 seconds; such process for preparing activated alumina powder has in particular, been described in French Pat. No. 1,108,011;

(vi) By treating in an aqueous medium having a pH below 9 an activated alumina powder obtained by rapid dehydration of hydrargillite in a stream of hot gases, spray-drying, and then calcination (process described in published European Patent Application No. 15,196).

The alumina fillers produced according to the various above processes can be classified into two groups. The first group relates to the filler obtained after drying and, if appropriate, calcination, which have a certain degree of dispersion. These materials can be employed as such for use as fillers after optional grinding and screening. The second group relates to fillers produced after drying which have a degree of dispersion which is lower than that of the fillers of the first group. To be employed, these fillers require a calcination stage a temperature above 300° C., and they are therefore capable of being used according to the invention, after optional grinding and screening.

According to the invention, the alumina supports may be obtained by mixing the filler and the binder in the form of powders, the binder in the form of powder may be various products: boehmite, pseudo-boehmite, bayerite, amorphous alumina gels, aluminum hydroxide gels, ultrafine hydrargillite in the non-peptized state. The powdery mixture is then placed in contact with water or acidified water. The filter-binder-water mixture is produced in such a manner that the pH of the final composition is below 4 and in proportions such that the degree of dispersion of the final composition ranges from 10 to 80%.

In another embodiment of the invention, it is possible to mix, with stirring, the filler in the form of powder and the binder in the form of alumina suspension or dispersion in proportions such that the degree of dispersion of the composition ranges from 10 to 80% and the pH of the final composition is below 4.

The forming of the mixture of binder and alumina filler and of the portion of the active phase according to the second stage of the process of the invention may be carried out by any suitable means and, for example: by extrusion, by the method known as the rotary pillbox (or rotaty bowl, or rotary granulator, or the like), or by the tableting agglomeration method, by the method known as dropping into oil ("oil-drop") and in particular according to the process described in published European Patent Application No. 15,801 or by coating the filler-binder mixture on a metal or ceramic substrate and in particular according to the process described in published European Patent Application No. 73,703.

According to the third stage of the process of the invention, after the mixture is formed, it is dried, the drying temperature ranges from approximately 100° to 200° C. Calcining at a temperature of from 200° to 700° C. is then carried out, if appropriate.

In the fourth stage of the process of the invention, the remaining portion of the active phase is then introduced.

This introduction is carried out by impregnating the formed, dried and optionally calcined mixture with the first group metals and the additional metals or precursors thereof.

In the fifth stage of the process of the invention, the catalyst obtained is dried and then it is activated in a stream of air at a temperature of approximately 300° to 800° C. for several hours.

Activation of the catalyst may advantageously be carried out in a reducing atmosphere at a temperature of from approximately 200° to 700° C.; for example, hydrogen, carbon monoxide and/or hydrogen sulfide may be employed as reducing agents.

The preferred embodiments of the process of the invention are described below for the preferred catalytic formulations. These formulations are those for which the first group metals forming the active phase are at least one of the metals platinum, palladium, iridium and rhodium and those for which the additional metals are cerium and/or iron and, if appropriate, at least one of the metals zirconium, copper and yttrium.

In this case the major portion of the cerium and/or iron and, if appropriate, zirconium, copper and yttrium is introduced in the binder during the first stage.

The platinum group metals platinum, iridium and rhodium are introduced in the fourth stage; palladium being capable of being introduced during this fourth stage, but preferably being introduced during the first stage in the binder.

Various compounds which are used to introduce the metal into the catalyst may be selected from among the inorganic or organic precursor compounds of said metals.

For the preferred catalytic formulations, there are preferably used, as compounds of iron and/or cerium, iron and/or cerium salts and, more particularly, ferric nitrate, ammoniacal iron citrate, ferric chloride and cerous nitrate, cerous acetate, cerous chloride and ammoniacal ceric nitrate, peptizable cerium hydroxide; as compounds of rhodium, platinum and palladium which may be employed, particularly representative are hydrated rhodium trichloride, chloroplatinic acid, palladium chloride, palladium nitrate and rhodium(III) chloropentammine dichloride and platinum(II) and palladium (II) tetrammine dichlorides.

Furthermore, as is also well known to this art, the supports employed according to the process of the invention are advantageously treated such as to impart good thermal stability over time to same. These treatments consist particularly of a stabilization of the oxide or of the oxide coating which forms the support (in general aluminum oxide) with alkaline earth metals, silica and/or the rare earths.

The catalysts obtained according to the process of the invention have clearly improved efficiency and life for the treatment of exhaust gases from internal combustion engines and make it possible to remove the major amount of carbon monoxide, burned hydrocarbons and, if appropriate, the nitrogen oxides which are present in these gases.

In order to further illustrate the present invention and the advantages thereof, the following specific examples are given, it being understood that same are intended only as illustrative and in nowise limitative.

EXAMPLE 1

Preparation Of A Catalyst (A) Of The Prior Art 100 g of alumina beads were prepared according to the process described in published European Patent Application No. 15,801.

These beads had a specific surface of 100 m$^2$/g, a total pore volume of 1.20 cm$^3$/g and a volume of 0.45 cm$^3$/g consisting of macropores with a diameter above 1000 Å.

These beads were impregnated with 120 cm$^3$ of an aqueous solution of cerous nitrate, ferric nitrate and cupric nitrate containing 3.5 g of cerium, 1.0 g of iron and 0.5 g of copper.

After 30 minutes of impregnation, the beads were dried at 150° C. and then calcined in air at 550° C. for 3 hours.

They were then impregnated with 110 cm$^3$ of a solution of hexachloroplatinic acid, hydrated rhodium trichloride and palladium nitrate containing 100 mg of platinum, 10 mg of rhodium and 50 mg of palladium.

After 30 minutes of impregnation, the beads were dried at 150° C. and then calcined at 350° C. for 3 hours in a stream of air circulated at 200 liters per hour.

The catalyst (A) prepared in this manner contained 0.100% of platinum, 0.010% of rhodium, 0.050% of palladium, 3.5% cerium, 1.0% of iron and 0.5% of copper, by weight relative to support.

EXAMPLE 2

Preparation Of A Catalyst (B) Of The Prior Art

An aqueous suspension of alumina was prepared according to the process described in published European Patent Application No. 73,703. This suspension was employed for coating a 1.98 liter ceramic monolith structure marketed by Corning Company, containing 400 cells per square inch; the 1.98 liter monolith was immersed in the suspension at pH 3.5, containing 24% by weight of alumina.

The abovementioned support was drained and dried such as to empty its channels, and it was then calcined at 600° C. for 3 hours. The monolith coated in this manner was immersed in an aqueous solution of zirconyl nitrate and cerium nitrate for 30 minutes; then it was drained and dried at 150° C. and calcined at 550° C. for 3 hours. The concentrations of zirconyl nitrate and cerium nitrate in the solution were such that, after immersion and calcining, the monolith contained 3.0% by weight of zirconium 2.0% by weight of cerium.

The substrate was then impregnated by dipping it in an aqueous solution of hexachloroplatinic acid.

The concentration of hexachloroplatinic acid was such that the monolith was impregnated with 1.5 g of platinum. After 30 minutes of impregnation, the monolith was drained, blown and dried at 150° C. and then activated at 350° C. for 3 hours in a calcining furnace.

The catalyst (B) prepared in this manner contained 0.150% of platinum, 3.0% of zirconium and 2.0% of cerium by weight relative to the monolith catalyst.

EXAMPLE 3

Preparation Of A Catalyst (C) Of The Prior Art

An aqueous suspension of alumina was prepared according to the process described in published European Patent Application No. 73,703. To this alumina suspension was added an aqueous solution of cerium nitrate, zirconyl nitrate and silicic acid which was freshly prepared by exchange of a sodium silicate solution on DUOLITE C 464 resin.

The concentrations of cerium nitrate, zirconyl nitrate and silicic acid were such that the suspension containing 20% by weight of alumina contained 8.0% of cerium, 4.0% of zirconium and 4% of silica by weight relative to the alumina. This suspension was employed for coating a 1.48 liter ceramic monolith structure containing 400 cells per square inch. The monolith was immersed in the suspension at pH 3.5 and was then drained, blown and dried to empty its channels, and it was then calcined at 600° C. for 3 hours.

The substrate was then impregnated by dipping it in an aqueous solution of hexachloroplatinic acid and of palladium nitrate. The concentrations of hexachloroplatinic acid and palladium nitrate were such that the 0.64 kg monolith was impregnated with 1.5 g of platinum and 750 mg of palladium. After 30 minutes of impregnation, the monolith was drained, blown and dried at 150° C. and then activated at 350° C. for 3 hours in a calcining furnace.

The catalyst (C) prepared in this manner contained 0.234% of platinum, 0.117% of palladium, 1% of cerium, 0.5% of zirconium and 0.5% of silica by weight relative to the monolith catalyst.

EXAMPLE 4

Preparation Of A Catalyst (D) Of The Prior Art

An aqueous suspension of alumina was prepared according to the procedure described in Example 3. In this example, an aqueous solution of ferric nitrate, cerous nitrate and yttrium nitrate was employed, containing 2.0% of iron, 5.0% of cerium and 0.01% of yttrium by weight relative to alumina.

This suspension was employed for coating a metal monolith structure manufactured from a metal sheet marketed under the trademark FECRALLOY. The 1.2 liter metal monolith was immersed in the suspension at pH=3.5, and it was then drained and dried to empty the channels and it was then calcined at 600° C. for 3 hours. The substrate was then impregnated by dipping it into an aqueous solution of hexachloroplatinic acid, the concentration of which was such that the 1.6 kg monolith was impregnated with 2.0 g of platinum. After 30 minutes of impregnation, the monolith was drained, blown and dried at 150° C. and then activated at 350° C. for 3 hours in a calcining furnace. The catalyst (D) thus prepared contained 0.125% of platinum, 0.125% of iron, 0.375% of cerium and 0.000625% of yttrium by weight relative to the monolith catalyst, which were deposited on the alumina coating.

EXAMPLE 5

Preparation Of A Catalyst (E) Of The Prior Art

An aqueous suspension of alumina was prepared according to the process described in published European Patent Application No. 73,703. To this alumina suspension was added an aqueous solution of cerous nitrate and ferric nitrate.

The concentration of cerous nitrate and ferric nitrate were such that the suspension containing 20% by weight of alumina contained 16.0% of cerium and 4.0% of iron by weight relative to the alumina. This suspension was employed for coating a 1.98 liter ceramic monolith structure containing 400 cells per square inch. The monolith was immersed in the suspension at pH 3.5 and was then drained, blown and dried to empty its channels, and it was then calcined at 600° C. for 3 hours.

The substrate was then impregnated by dipping it into an aqueous solution of hexachloroplatinic acid, palladium nitrate and rhodium trichloride. The concentrations of hexachloroplatinic acid, palladium nitrate and rhodium trichloride were such that the monolith was impregnated with 750 mg of platinum, 1 g of palladium and 75 mg of rhodium. Afer 30 minutes of impregnation, the monolith was drained, blown and dried at 150° C., and then activated at 350° C. for 3 hours in a calcining furnace.

The catalyst (E) prepared in this manner contained 0.075% of platinum, 0.1% of palladium, 0.0075 mg of rhodium, 2% of cerium and 0.5% of iron by weight relative to the monolith catalyst.

EXAMPLE 6

Preparation Of A Catalyst (F) According To The Invention

A sol of ultrafine boehmites was prepared according to the process described in published European Patent Application No. 15,801.

The production of a cake of alumina gel (I) was carried by continuous precipitation of a sodium aluminate solution a nitric acid solution. The gel cake was dewatered, filtered, washed and then treated at 115° C. for 24 hours in a stirred autoclave. The product obtained was in the form of paste containing 12% of alumina, calculated as $Al_2O_3$. Electron microscope photography of this product demonstrated that it consisted of wholly fibrillar ultrafine boehmite composed of single crystals 500 to 1,000 Å in size.

An activated alumina was prepared by rapid dehydration of hydrargillite in a reactor with entrainment with the aid of a stream of hot gases, the entry temperature of which was approximately 800° C.; the contact time was approximately half a second. This alumina had a specific surface of 300 m²/g, an ignition weight loss of 4%, and the X-ray diagram demonstrated that the alumina in question had a poorly crystallized structure having, in particular, diffuse lines in the region of 2.40 Å and 1.40 Å, common to the transition aluminas gamma, eta and chi. The particle size was such that 70% of the particles had a diameter below 17 microns.

500 g of activated alumina were introduced into an autoclave containing 10 l of an aqueous solution of nitric acid having a pH of 0.85, such that the molar ratio $NO_3/Al_2O_3$ was equal to 0.3. The autoclave was stirred; it was heated for 8 hours at 130° C.

An alumina suspension was obtained, containing ultrafine boehmite in fibrillar form with a degree of conversion of approximately 40%.

The fine boehmite suspension produced was diluted and treated with an ammonia solution such as to adjust its pH to approximately 9.

Examination of this alumina suspension by means of transmission electron microscopy demonstrated that its crystallized fraction consisted of ultrafine boehmite entirely in fibrillar form composed of long narrow lamellae, the length of which was approximately 2,000 to 2,500 Å and the other two dimensions of which ranged from approximately 20 to 50 Å.

The alumina suspension was sprayed-dried in a stream of hot gases at an entry temperature of from 700° to 800° C.

The spheroidal particles (II) obtained were then calcined at 950° C.; the alumina was crystallized substantially in the theta phase. The product had a specific surface of 110 m²/g and a pore volume of 0.60 cm³/g. Its particle size distribution was such that 50% of the particles had a diameter $\phi$ included around a mean value $\phi_M = 7$ microns.

240 grams of alumina gel (I) were impregnated with an aqueous solution of palladium nitrate, cerous nitrate, ferric nitrate and cupric nitrate.

The suspension obtained, which formed the alumina gel (III), was sprayed-dried at 250° C. in order to convert it into powder form.

240 g of alumina gel (III) were mixed in 2,000 ml of distilled water, stirred for 10 minutes, and the 760 g of alumina in the form of spheroidal particles (II) were added.

Droplets of this suspension I were formed by means of calibrated tubes having a bore of approximately 2.5 mm. The droplets fell into a column 600 mm in diameter containing a layer of oil of approximately 6 centimeters floating on an ammonia solution having a concentration of approximately 20 g/l. The residence time of the particles in the ammonia solution was approximately 2 minutes. The droplets became round in the oil, and gelled in the ammonia solution. The beads collected were rigid and could be subjected to decanting operations without being deformed; they were then dried and calcined at 650° C. for 1 hour.

100 g of beads were then impregnated with 110 cm$^3$ of a solution of hexachloroplatinic acid and hydrated rhodium trichloride containing 100 mg of platinum and 10 mg of rhodium.

After 30 minutes of impregnation, the beads were dried at 150° C. and then calcined at 350° C. for 3 hours in a stream of air circulated at 200 liters per hour.

The catalyst (F) prepared in this manner contained 0.100% of platinum, 0.010% of rhodium, 0.050% of palladium, 3.5% of cerium, 1.0% of iron and 0.5% of copper by weight relative to the support.

EXAMPLE 7

Preparation of a Catalyst (G) According to the Invention

A binder and an alumina filler were prepared according to the process described in published European Patent Application No. 73,703.

An alumina binder (I) was prepared in the following manner: 5,000 g of alumina obtained by hydration of hydrargillite in a stream of hot gas at 800° C. for 0.5 seconds were introduced into an autoclave containing a solution of nitric acid at pH=1. The suspension was heated under stirring for 4 hours at 180° C. The suspension obtained, which formed the alumina binder (I), was spray-dried at 150° C. in order to convert it into powder form; X-ray microscopy demonstrated this powder to have a fibrillar boehmite structure.

A fraction of this powder was calcined in air at 600° C. for 2 hours to obtain the alumina filler (II).

The binder and the filler had the following degrees of dispersion:

|  | Degree of Dispersion |
| --- | --- |
| Alumina binder (I) | 75% |
| Alumina filler (II) | 5% |

300 grams of the alumina binder (I) were impregnated with an aqueous solution of cerium nitrate and zirconyl nitrate containing 20 g of cerium and 30 g of zirconium. The suspension obtained, which formed the alumina binder (III), was spray-dried at 250° C. in order to convert it into powder form. The alumina binder (III) was dispersed in the form of powder in 2,000 cm$^3$ of distilled water, stirred for 10 minutes and then 700 g of alumina filler (II) were added, the stirring being continued for another 10 minutes.

The degree of dispersion of the composition produced was 24% and its viscosity was 65 centipoises.

This suspension (II) was employed for coating a 1.98 liter ceramic monolith structure containing 400 cells per square inch. The monolith was immersed in the suspension at pH=3.5. The aforesaid support was drained, blown and dried to empty its channels and it was then calcined at 600° C. for 3 hours.

The substrate was then impregnated by dipping it in an aqueous solution of hexachloroplatinic acid. The concentration of hexachloroplatinic acid was such that the monolith was impregnated with 1.5 g of platinum. After 30 minutes of impregnation, the monolith was drained, blown and dried at 150° C. and then activated at 350° C. for 3 hours in a calcining furnace.

The catalyst (G) prepared in this manner contained 0.150% of platinum, 2% of cerium and 3% of zirconium by weight relative to the monolith catalyst.

EXAMPLE 8

Preparation Of A Catalyst (H) According To The Invention 300 g of binder (I) prepared in the manner described in Example 7 were impregnated with an aqueous solution of palladium nitrate and cerous nitrate containing 1.17 g of palladium and 10 g of cerium. The suspension obtained, which formed the alumina binder (IV), was spray-dried at 250° C. in order to convert it into powder form.

An alumina filler (V) was prepared in the following manner: 1 kg of beads of gamma-structure alumina, which were prepared according to the processes described in French Pat. Nos. 1,449,904 and 1,386,364 by autoclaving in the presence of acid agglomerates of activated alumina, drying and calcining, was used. These alumina beads obtained had a specific surface of 100 m$^2$/g, a total pore volume of 0.90 cm$^3$/g and a volume of 0.40 cm$^3$/g formed by macropores having a diameter greater than 1,000 Å. These beads were impregnated with 900 cm$^3$ of an aqueous solution of zirconyl nitrate and silicic acid containing 71.4 g of zirconium and 71.4 g of silica.

After 30 minutes of impregnation, the beads were dried at 150° C. and then calcined in air at 600° C. for 3 hours.

They were then ground for one hour in a ball mill.

The characteristics of the obtained alumina filler (V) were as follows:

Degree of dispersion: 5%

Particle size distribution: the mean diameter of the particles was 7 microns.

300 g of alumina binder (IV) in powder form were dispersed in 2,000 cm$^3$ of distilled water, stirred for 10 minutes and then 700 g of alumina filler (V) were added, and stirring was continued for another 10 minutes. The degree of dispersion of the composition obtained was 25% and its viscosity was 75 centipoises.

This suspension (III) was employed for coating a 1.48 liter ceramic monolith structure containing 400 cells per square inch. The monolith was immersed in the suspension at pH=3.5, then it was drained, blown and dried in order to empty its channels, and it was then calcined at 600° C. for 3 hours.

The substrate was then impregnated by dipping in an aqueous solution of hexachloroplatinic acid, the concentration of was such that the monolith (0.64 kg) was impregnated with 1.5 g of platinum. After 30 minutes of impregnation, the monolith was drained, blown and dried at 150° C. and then activated at 350° C. for 3 hours in a calcining furnace.

The catalyst (H) prepared in this manner contained 0.234% of platinum, 0.117% of palladium, 1% of cerium, 0.5% of zirconium and 0.5% of silica by weight relative to the monolith catalyst.

EXAMPLE 9

Preparation Of A Catalyst (I) According To The Invention 300 g of binder (VI) prepared in the manner described in Example 7 were impregnated with an aqueous solution of cerous nitrate and hexachloroplatinic acid containing 50 g of cerium and 16.66 g of platinum. The suspension obtained, which formed the alumina binder (VI), was spray-dried at 250° C. in order to convert it into powder form.

An alumina filler VII was prepared in the following manner: 1 kg of activated alumina beads having a specific surface of 250 m²/g and a total pore volume of 0.55 cm³/g was impregnated with 550 cm³ of a solution of ferric nitrate and yttrium nitrate containing 26.3 g of iron and 0.1315 g of yttrium. After 30 minutes of impregnation, the beads were dried at 150° C. and then calcined in air at 600° C. for 3 hours. They were then ground for one hour in a ball mill. The characteristics of the alumina filler (VII) produced were as follows:

Degree of dispersion: 4%

Particle size distribution: the mean diameter of the particles was 13 microns.

300 g of alumina binder (VI) in powder form were dispersed in 2,000 cm³ of distilled water, stirred for 10 minutes and then 700 g of alumina filler (VII) were added, and stirring was continued for another 10 minutes. The degree of dispersion of the composition obtained was 22% and its viscosity was 60 centipoises.

This suspension (IV) was employed for coating a 1.2 liter metal monolith structure manufactured from a metal sheet marketed under the trademark FECRAL-LOY. The monolith was immersed in the suspension at pH=3.5 and it was then drained, blown and dried to empty its channels, and it was then calcined at 500° C. for 3 hours.

The catalyst (I) thus prepared contained 0.125% of platinum, 0.125% of iron, 0.375% of cerium and 0.000625% of yttrium deposited on the alumina coating, by weight relative to the monolith catalyst.

EXAMPLE 10

Preparation Of A Catalyst (J) According To The Invention 300 g of binder prepared in the manner described in Example 7 were impregnated with an aqueous solution of palladium nitrate, cerous nitrate and ferric nitrate containing 10 g of palladium, 50 g of cerium and 25 g of iron. The suspension obtained, which formed the alumina binder (VIII), was spray-dried at 250° C. in order to convert it into powder form.

An alumina filler (IX) was prepared in the following manner: 1 kg of beads of gamma-structure alumina which had been prepared according to the processes described in French Pat. Nos. 1,449,904 and 1,386,364 by autoclaving in the presence of acid agglomerates of activated alumina, drying and calcining, was used. These alumina beads obtained had a specific surface of 100 m²/g, a total pore volume of 0.90 cm³/g and a volume of 0.40 cm³/g, a volume of the macropores having a diameter greater than 1,000 Å. These beads were impregnated with 900 cm³ of an aqueous solution of cerous nitrate and ferric nitrate containing 150 g of cerium and 25 g of iron.

After 30 minutes of impregnation, the beads were dried at 150° C., then calcined in air at 600° C. for 3 hours.

They were then ground for one hour in a ball mill.

The characteristics of the obtained alumina filler (V) were as follows:

Degree of dispersion: 5%

Particle size distribution: the mean diameter of the particles was 7 microns.

300 g of alumina binder (VIII) in the form of powder were dispersed in 2,000 cm³ of distilled water, stirred for 10 minutes, and then 700 g of alumina filler (IX) were added, and stirring was continued for another 10 minutes. The degree of dispersion of the composition obtained was 25% and its viscosity was 70 centipoises.

This suspension (X) was employed for coating a 1.98 liter ceramic monolith structure containing 400 cells per square inch. The monolith was immersed in the suspension at pH=3.5 and it was then drained, blown and dried to empty its channels, and it was then calcined at 600° C. for 3 hours.

The substrate was then impregnated by dipping it in an aqueous solution of hexachloroplatinic acid and rhodium trichloride, the concentrations of which were such that the monolith was impregnated with 750 mg of platinum and 75 mg of rhodium. After 30 minutes of impregnation, the monolith was drained, blown and dried at 150° C. and then activated at 350° C. for 3 hours in a calcining furnace.

The catalyst (J) thus prepared contained 0.075% of platinum, 1.0% of palladium, 0.0075% of rhodium, 2% of cerium and 0.5% of iron by weight relative to the monolith catalyst.

EXAMPLE 11

Initial Activity Of Catalysts (A), (E), (F) And (J) For Simultaneous Removal Of Carbon Monoxide, Unburned Hydrocarbons And Nitrogen Oxides In Vehicular Exhaust Gases The vehicle employed for these tests was a USA type Renault 18 equipped with a 1,647 cm³ internal combustion engine fitted with BOSCH L-JETRONIC fuel injection, regulated by means of an oxygen probe and operating on lead-free gasoline.

The measurement of the exhaust emissions of this vehicle was carried out on a roller test bench according to the procedure CVS-C/H in accordance with the American Federal Standards: The base emissions of the vehicle without a catalytic converter were as follows:

CO=15.1 g/mile

HC=2.9 g/mile $NO_x$=4.9 g/mile

For testing the catalysts in the form of beads, an experimental catalyst chamber of the type with radial circulation, a volume of 1,700 cm³, and made according to the principle described in French Pat. No. 74/06,395, was placed in the exhaust system at a distance of approximately 1.60 m from the engine. The catalysts on monoliths were mounted in welded metal casings and installed in the exhaust system at a distance of approximately 0.80 m from the engine, in the location orginally provided by the manufacturer of the vehicle.

Table I below reports the results obtained using the catalysts (A), (E), (F) and (J) described in Examples 1, 5, 6 and 10, after a preliminary stabilization carried out by road driving the vehicle for 80 km on the eve of the tests.

TABLE I

| | Example Number | Catalyst reference | Emission (g/mile) | | |
|---|---|---|---|---|---|
| | | | CO | HC | NO$_x$ |
| Prior art | 1 | (A) | 2.55 | 0.59 | 0.72 |
| | 5 | (E) | 2.44 | 0.55 | 0.77 |
| Invention | 6 | (F) | 1.95 | 0.37 | 0.44 |
| | 10 | (J) | 1.88 | 0.29 | 0.46 |

It will be seen that the catalytic activity of the catalysts prepared according to the invention is, in all cases, higher than that of catalysts prepared according to the prior art.

EXAMPLE 12

Initial Activity Of Ihe Catalysts (B), (C), (D), (G), (H) and (I) For Oxidation Of Carbon Monoxide And Of Unburned Hydrocarbons In The Vehicular Exhaust Gases The vehicle employed for these tests was a Renault 20 equipped with a 1,995 cm$^3$ internal combustion engine fitted with an exhaust gas recycle and a system of Pulsair valves for adding secondary air to the exhaust gases, and operating on lead-free gasoline. The measurement of the emissions of this vehicle was carried out on a roller test bench according to the procedure CVS-C:H in accordance with the American Federal Standards.

The base emissions of the vehicle without a catalytic converter, but with secondary air injection in operation, were as follows:

CO = 28.7 g/mile
HC = 2.9 g/mile
NO$_x$ = 2.6 g/mile

For the tests, the catalysts were placed in welded metal casings and fitted in the exhaust system at a distance of approximately 1.10 m from the engine.

Table II below reports the results obtained using the catalysts (B), (C), (D), (G), (H) and (I) described in Examples 2, 3, 4, 7, 8 and 9.

TABLE II

| | Example Number | Catalyst reference | Emisson (g/mile) | |
|---|---|---|---|---|
| | | | CO | HC |
| Prior art | 2 | (B) | 2.53 | 0.27 |
| | 3 | (C) | 2.03 | 0.19 |
| | 4 | (D) | 2.47 | 0.22 |
| Invention | 7 | (G) | 2.11 | 0.23 |
| | 8 | (H) | 1.76 | 0.14 |
| | 9 | (I) | 2.24 | 0.18 |

It will be seen that the catalytic activity of the catalysts prepared according to the invention is, in every case, higher than that of catalysts prepared according to the prior art.

EXAMPLE 13

Endurance Behavior Of The Catalysts (A), (E), (F) and (J) For Simultaneous Removal Of Carbon Monoxide, Unburned Hydrocarbons And Nitrogen Oxides In The Exhaust Gases Of An Engine Operating At Richness 1 On A Test Bench The engine employed for these tests was a USA-type Renault 18 1,647 cm$^3$ internal combusion engine, fitted with BOSCH L-JETRONIC fuel injection regulated at richness 1 by means of an oxygen probe placed at the outlet on the exhaust manifold.

The fuel consumed by the engine in these tests was ead-free gasoline having, however, a residual lead content adjusted in all cases to 0.013 g/liter.

With the engine coupled to a dynamometric brake, the running regime and the load which were imposed on the engine were controlled such as to provide an exhaust gas flow of 85/Nm$^3$/h and a catalyst chamber inlet temperature of 475±10° C.

Catalyst chambers similar to those employed in Example 10 and containing catalysts (A), (E), (F) and (J) described in Examples 1, 5, 6 and 10 were successively fitted in the exhaust system of the engine.

The measurement of the degree of removal of each of the three contaminants was carried out at regular intervals by analyzing the gases upstream and downstream of the chambers.

Table III below reports the results obtained at the beginning of the test and after 600 hours of running the engine.

It will be seen that the stability of the activity of the catalysts prepared according to the invention is substantially improved relative to that of the catalysts prepared according to the prior art.

TABLE III

| | Example Number | Catalyst reference | Initial purification (%) | | | Purification after 600 h (%) | | |
|---|---|---|---|---|---|---|---|---|
| | | | CO | HC | NO$_x$ | CO | HC | NO$_x$ |
| Prior art | 1 | (A) | 96.5 | 95 | 89 | 89.7 | 86 | 81.4 |
| | 5 | (E) | 97.0 | 95 | 91 | 87.8 | 84 | 79.8 |
| Invention | 6 | (F) | 98.5 | 97.3 | 91.8 | 93.7 | 90.1 | 86.6 |
| | 10 | (J) | 97.7 | 96.7 | 93 | 92.5 | 88.2 | 85.8 |

EXAMPLE 13

Endurance Behavior Of Catalysts (B), (C), (D), (G), (H) And (I) For The Oxidation Of Carbon Monoxide And Unburned Hydrocarbons In The Exhaust Gases Of An Engine On A Test Bench The engine employed for these tests was an 843/20-type Renault R20 engine of total capacity 1,647 cm$^3$, equipped with a secondary air supply via Pulsair valves.

The fuel consumed by the engine in these test was lead-free gasoline having, however, a residual lead content adjusted in all cases to 0.013 g/liter. With the engine coupled to a dynamometric brake, the running regime and the load imposed on the engine were controlled such as to have an exhaust gas flow of 85 Nm$^3$/h and a catalyst chamber inlet temperature of 475±10° C.

The carburation and ignition settings were those recommended by the manufacturer.

Catalyst chambers similar to those employed in Example 11 and containing catalysts (B), (C), (D), (G), (H) and (I) described in Examples 2, 3, 4, 7, 8 and 9 were successively fitted in the exhaust system of the engine.

The measurement of the degree of removal of carbon monoxide and unburned hydrocarbons was carried out at regular intervals by analyzing the gases upstream and downstream of the chambers.

Table IV below reports the results obtained at the beginning of the test and after 800 hours of running the engine.

TABLE IV

| | Example Number | Catalyst reference | Initial purification (%) | | Purification after 600 h (%) | |
|---|---|---|---|---|---|---|
| | | | CO | HC | CO | HC |
| Prior Art | 2 | (B) | 98.6 | 89.3 | 84.5 | 76.7 |
| | 3 | (C) | 96.8 | 94.2 | 83.6 | 83.1 |
| | 4 | (D) | 97.9 | 91.5 | 82.5 | 76.8 |
| Invention | 7 | (G) | 99.9 | 98.6 | 92.1 | 91.3 |
| | 8 | (H) | 98.3 | 96.4 | 88.6 | 87.8 |
| | 9 | (I) | 99.2 | 98.2 | 87.9 | 89.9 |

It will be seen that the stability of the activity of the catalysts prepared according to the invention is substantially improved relative to those of the catalysts prepared according to the prior art.

While the invention has been described in terms of various preferred embodiments, the skilled artisan will appreciate that various modifications, substitutions, omissions, and changes may be made without departing from the spirit thereof. Accordingly, it is intended that the scope of the present invention by limited solely by the scope of the following claims.

What is claimed is:

1. A process for the preparation of a composite active phase/support catalyst adapted for the treatment of internal combustion engine exhaust gases, the active phase of which comprises at least one metal from a first group comprising platinum, palladium, iridium, rhodium, ruthenium, rhenium, silver and gold and at least one metal from an additional group comprises cobalt, zinc, manganese, nickel, tungsten, yttrium, a lanthanide, iron, copper, chromium, ziroconium, molybdenum, tin, calcium, strontium and barium and the support therefor comprising binder/filler admixture, which process comprises (i) forming a first intimate admixture of the binder material and said at least one metal from the first group, or precursor thereof, and/or said at least one metal from the additional group wherein the first admixture contains at least 50% by weight of the total in the composite catalyst of said at least one metal from the first group and/or at least 50% by weight of the total in the composite catalyst of said at least one metal from the additional group, (ii) combining the first admixture with filler to form a second intimate admixture, (iii) forming the second admixture into a catalyst shaped article, (iv) optionally calcining said catalyst shaped article, (v) in an aqueous medium incorporating the remainder of said at least one metal from the first group, or precursor thereof, and/or said at least one metal from the additional group into said catalyst shaped article, and thence (vi) drying and activating the composite catalyst.

2. The process as defined by claim 1, wherein said steps (i) and (ii) of forming intimate admixtures comprise formulating them in aqueous medium and step (iv) is preceded by drying the shaped catalyst.

3. The process as defined by claim 2, comprising formulating dispersed binder material and undispersed filler material.

4. The process as defined by claim 1, said binder/filler support comprising alumina.

5. The process as defined by claim 1, wherein at least 50% by weight of said at least one metal from the first group, or precursor thereof, and all of said at least one metal from the additional group are intimately admixed in said steps (i) and (ii).

6. The process as defined by claim 1, wherein said at least one metal from the first group, or precursor thereof, is incorporated into the catalyst shaped article in said step (v).

7. The process as defined by claim 1, said binder and filler material comprising the hydroxides or oxides of aluminum, silicon, titanium, zirconium, magnesium, calcium, strontium, barium, yttrium, a lanthanide, hafnium, thorium, niobium, tantalum, chromium, molybdenum, or tungsten, the amount of weight of binder material relative to filler material ranging from 10 to 80%.

8. The process as defined by claim 7, wherein said amount by weight of binder material relative to filler material ranges from 15 to 60%.

9. The process as defined by claim 7, the total amount of said at least one metal from the first group comprising from 0.005 to 0.8% by weight of said composite catalyst.

10. The process as defined by claim 9, the total amount of said at least one metal from the additional group comprising from 0.1 to 10% by weight of said composite catalyst.

11. The process as defined by claim 1, said at least one metal from the first group comprising platinum, palladium, iridium, rhodium, or plurality thereof, and said at least one metal from the additional group comprising cerium, iron, zironium, copper, yttrium, or plurality thereof.

12. The process as defined by claim 11, wherein said at least one metal from the additional group is incorporated with the binder material in said step (i) and platinum, iridium, rhodium, or plurality thereof, is incorporated into the catalyst shaped article in said step (v).

13. The process as defined by claim 12, wherein palladium is incorporated with the binder material in said step (i).

14. The process as defined by claim 12, wherein palladium is incorporated into the catalyst shaped article in said step (v).

15. The process as defined by claim 7, said binder material comprising aluminum hydroxide or oxyhydroxide and said filler material comprising aluminum oxide.

16. The process as defined by claim 1 wherein said metal from the first group is introduced into said binder during said admixing step (i).

17. The process as defined by claim 16 wherein a portion of said metal from the additional group is introduced the binder, in the filler, or in both the binder and the filler during said admixing step (i) and (ii).

18. The process as defined by claim 1 wherein said metal from the additional group is introduced into said binder during said admixing step (i).

19. The process as defined by claim 18 wherein said metal from the first group is incorporated into said catalyst shaped article during said step (v).

* * * * *